United States Patent [19]

Matthews

[11] Patent Number: 4,664,581

[45] Date of Patent: May 12, 1987

[54] SHEET HANDLING AND SEPARATOR APPARATUS AND METHOD

[75] Inventor: Robert K. Matthews, Grosse Ile, Mich.

[73] Assignee: Mechanical Separations, Inc., Trenton, Mich.

[21] Appl. No.: 679,628

[22] Filed: Dec. 10, 1984

[51] Int. Cl.$^4$ ............................................. B65G 59/08
[52] U.S. Cl. .................................. 414/330; 134/134; 414/28; 414/38; 414/103; 414/786
[58] Field of Search ................... 414/28, 29, 38, 103, 414/104, 330, 786; 271/210; 134/133, 134

[56] References Cited

U.S. PATENT DOCUMENTS

| | | | |
|---|---|---|---|
| 1,500,533 | 7/1924 | Stubbs | 414/28 |
| 1,753,933 | 4/1930 | Lormor | 414/103 |
| 2,168,205 | 8/1939 | Harten et al. | 414/754 X |
| 3,410,425 | 11/1968 | Guillaume | 414/107 |
| 3,534,748 | 10/1970 | Ekman | 134/133 X |
| 3,967,739 | 7/1976 | Kumagai | 414/33 |
| 4,004,699 | 1/1977 | Connon et al. | 414/28 |
| 4,007,750 | 2/1977 | Galloway | 134/133 X |

FOREIGN PATENT DOCUMENTS 53-22260 3/1978 Japan ................................. 414/330

Primary Examiner—Leslie J. Paperner
Attorney, Agent, or Firm—Hauke & Patalidis

[57] ABSTRACT

An apparatus and method for separating sheets or plates from a bundle and for placing said sheets or plates spaced-apart on a support rack. The bundle of sheets or plates is inclined to a position causing the sheets or plates to slide relative to each other by gravity and to abut at their lower edge on a substantially horizontal surface. The bundle of sheets or plates is subsequently erected to an approximate vertical position causing the sheets or plates to separate at their bottom. The sheets or plates are then separated at their top by means of a "comb" member, and a rack provided with support and separating pins is lifted into engagement with the bottom of the spaced-apart sheets or plates. The apparatus may be used in reverse for rebundling spaced-apart sheets or plates.

10 Claims, 12 Drawing Figures

SHEET HANDLING AND SEPARATOR APPARATUS AND METHOD

BACKGROUND OF THE INVENTION

The present invention relates to sheet handling and separator apparatus and method in general, and more particularly to an apparatus and method for separating metal sheets or plates from a bundle for loading the sheets or plates on a rack, in a spaced-apart relationship, for subsequent treatment such as treatment in a chemical bath.

Prior to being subjected to a chemical treatment, steel sheets or plates are generally loaded vertically on a rack and maintained spaced-apart from each other by upstanding pins mounted on the rack base or frame. After loading the steel sheets or plates on the rack, the rack is transported by appropriate conveyor means to a pickling bath, for example, or to any chemical bath for appropriate treatment.

The sheets or plates are loaded on the racks manually, one at a time, which is a rather slow process presenting many inconveniences in view of the weight of substantially large sheets or plates, requiring at least two workers for manually handling each sheet or plate, separating the sheets or plates from a bundle and carrying them to the rack one at a time for placing on the rack in a vertical position.

SUMMARY OF THE INVENTION

The principal object of the present invention is to provide an automatic and power actuated apparatus for separating metallic sheets or plates from a bundle and disposing the sheets or plates in a spaced-apart relationship onto a rack.

The many objects and advantages of the present invention will become apparent to those skilled in the art when the following description of an example of structure for practicing the method of the invention is read in conjunction with the accompanying drawing wherein:

DETAILED DESCRIPTION OF THE PREFERRED EMBODIMENT

Figure 1:
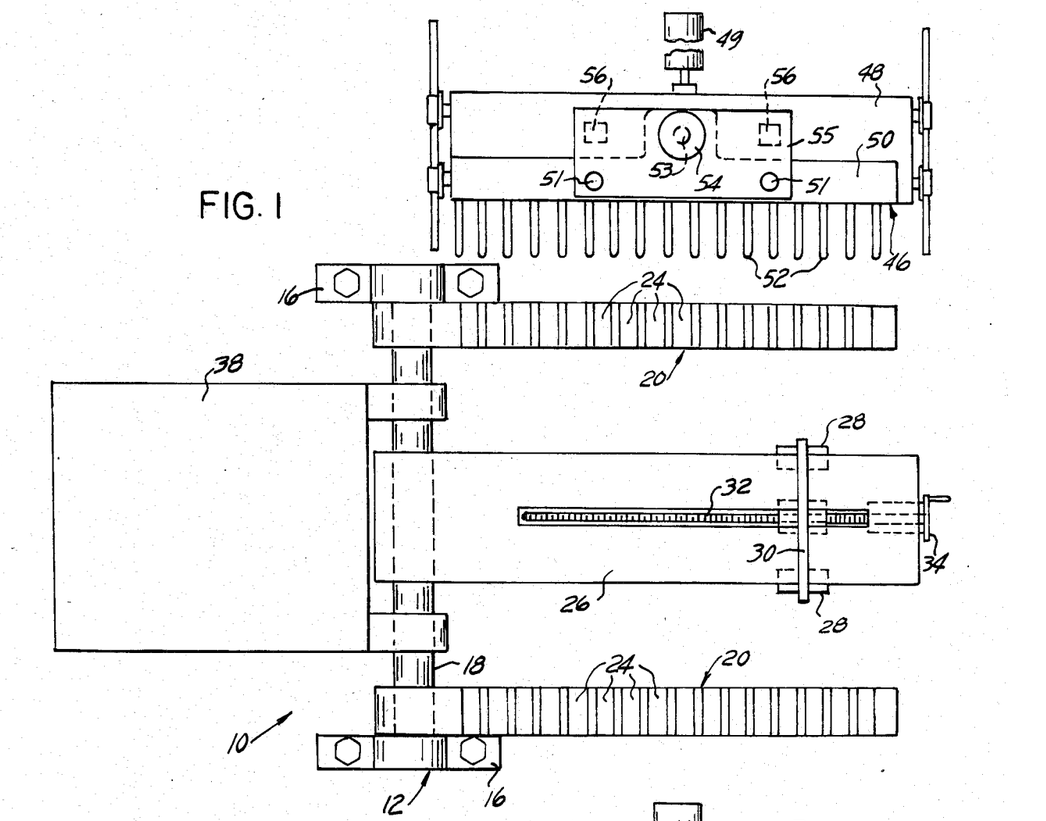
FIG. 1 is a schematic top plan view of a metallic sheet or plate separator according to the invention.
Figure 2:
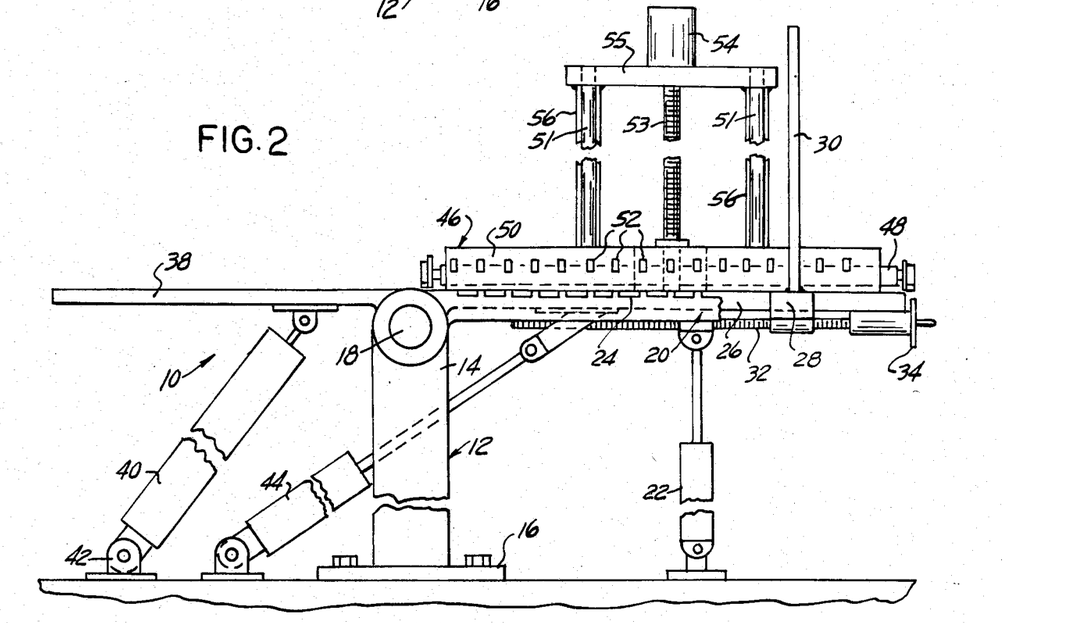
FIG. 2 is a schematic side elevation view thereof.

Referring to the drawing and more particularly to FIGS. 1 and 2 thereof, there is illustrated, in a schematic manner, a metal sheet or plate separator apparatus 10 according to the present invention. In the example of structure illustrated, the apparatus 10 comprises a support member 12, FIG. 2, which, for example, may consist of a pair of upright posts 14 provided at one end with a plate 16 for attachment to the ground, and supporting at their top each end of a shaft 18. A pair of parallel elongate arm members 20 are pivotally fastened to the shaft 18, one at each end of the shaft, and are each supported at their free end by, for example, a hydraulic jack 22. The two hydraulic jacks 22 are operable in unison such that the elongate arm members 20 remain substantially parallel in the course of their pivotal motions. Each elongate arm member 20 has a plurality of evenly spaced transverse slots or grooves 24 on its top surface.

A hinged platform 26, pivotable from a substantially horizontal position, as shown, relative to the shaft 18, is disposed between the two elongate arm members 20. The platform 26 has a slide 28 supporting a backstop plate 30. The slide 28 and the backstop plate 30 are longitudinally movable by means of a drivescrew 32 disposed below the platform 26, for example, and driving the slide 28 and the attached backstop plate 30 for positioning of the backstop plate 30 along the length of the platform 26, as a result of rotating the drivescrew 32 by means of a hand-wheel 34, or by other means such as a servo motor, not shown. A second platform defining a sheet or plate bundle support platform 38 is also arranged pivotable relative to the shaft 18.

Figure 10:
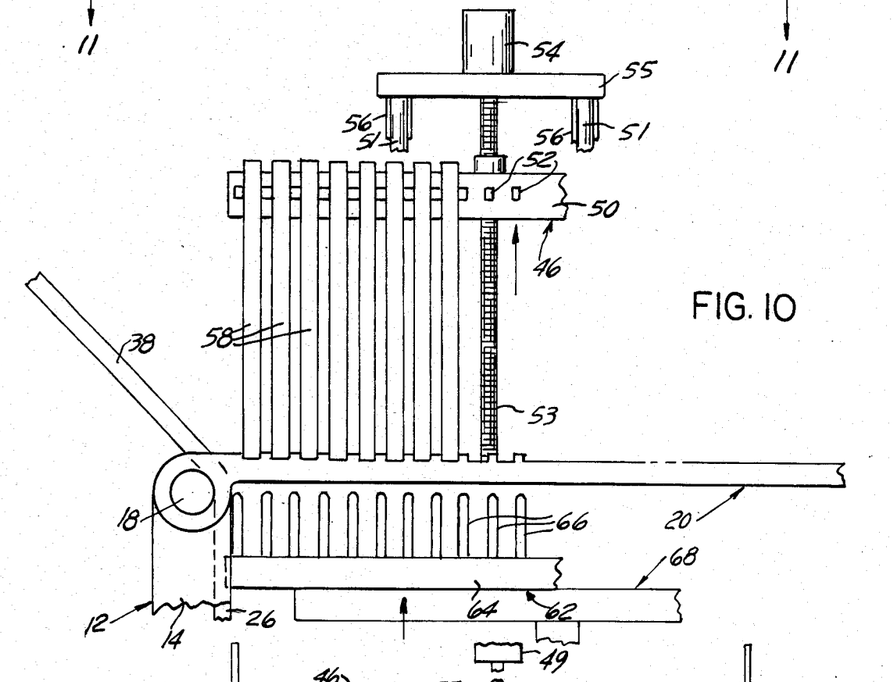
Figure 11:
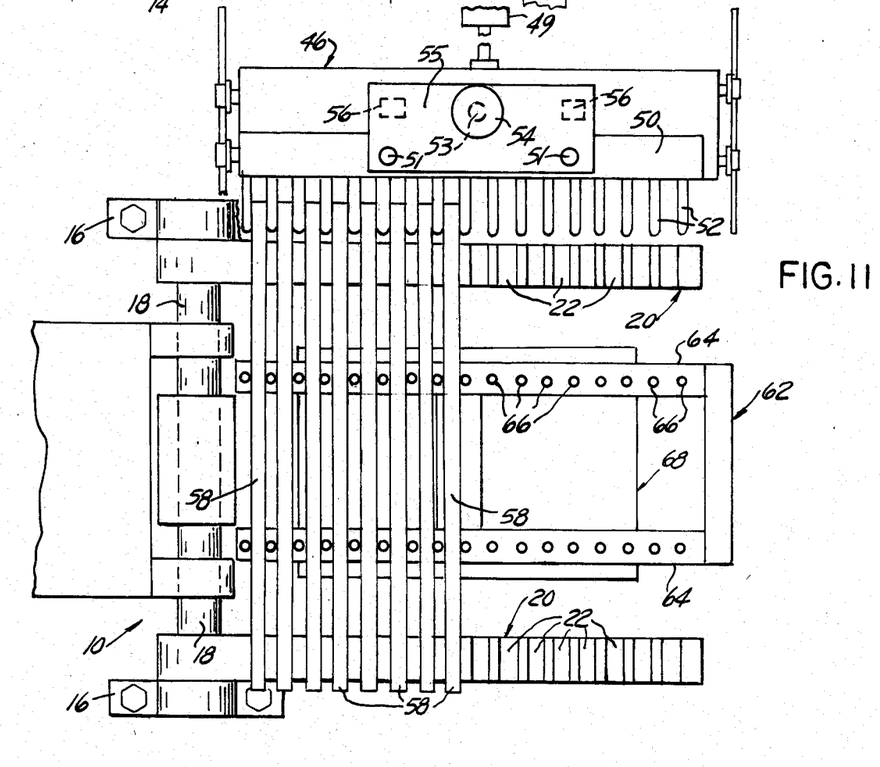
FIG. 11 is a top plan view from line 11—11 of FIG. 10.

Appropriate pivotal drive means, such as a hydraulic jack 40, for example, is disposed below the bundle support 38, one end of the hydraulic jack being pivotally connected below the bundle support 38 and the other end being pivotably connected to a clevis member 42 mounted on the ground or floor, such as to be pivotable from a substantially horizontal position, FIGS. 2 and 3, to an inclined position, FIGS. 4 and 5 and to a substantially vertical position with the free end of the bundle support 38 extended above the shaft 18, FIGS. 8-9. The platform 26 is similarly actuated by a hydraulic jack 44 from a substantially horizontal position, FIGS. 2 and 3, to inclined positions, FIGS. 4-5 and 8-9, and to a vertical position with the free end of the platform 26 extending below the shaft 18, FIGS. 10-11.

A vertically reciprocable comb member 46 is mounted parallel to the arm members 20 proximate one such arm. The comb member 46 comprises a support base 48 which is movable in a direction transverse to the arms 20, for example by means of a hydraulic jack 49 and a bar 50 capable of vertical motion relative to the support base 48 by being supported and guided relative thereto by means of a pair of pillars or columns 51. The comb bar 50 has a plurality of equidistant pins 52 projecting from the front thereof towards the corresponding arm member 20. Appropriate power means, such as a screwjack 53 driven by an electric motor 54 or the like, mounted on a plate or bridge 55 fastened to the top of the pillars or column 51 and to the top of upright support members 56, permits to controllably displace the bar 50 of the comb member 46 in a vertical direction relative to the support base 48.

Figure 3:
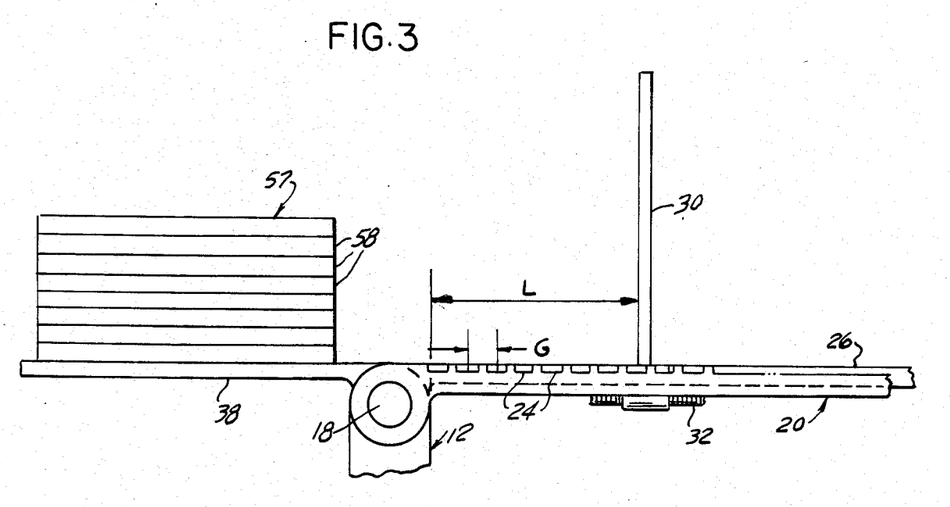
FIGS. 3-10 are views similar to FIG. 2 and illustrating schematically consecutive steps for separating metallic sheets or plates according to the invention.

In operation, a bundle 57 of sheets or plates 58, all substantially of the same thickness, is placed on the bundle support 38, FIG. 3, and the backstop plate 30 is adjusted longitudinally along the platform 26 by rotation of the screw 32, to a distance L from the common axis of pivoting of the platform 26 and of the bundle support 38 according to the equation:

$$L = G(n-1),$$

wherein G is the distance between the centerline of consecutive slots or grooves 24 in the arm members 20, and n is the number of sheets or plates 58 in the bundle 57.

Figure 4:
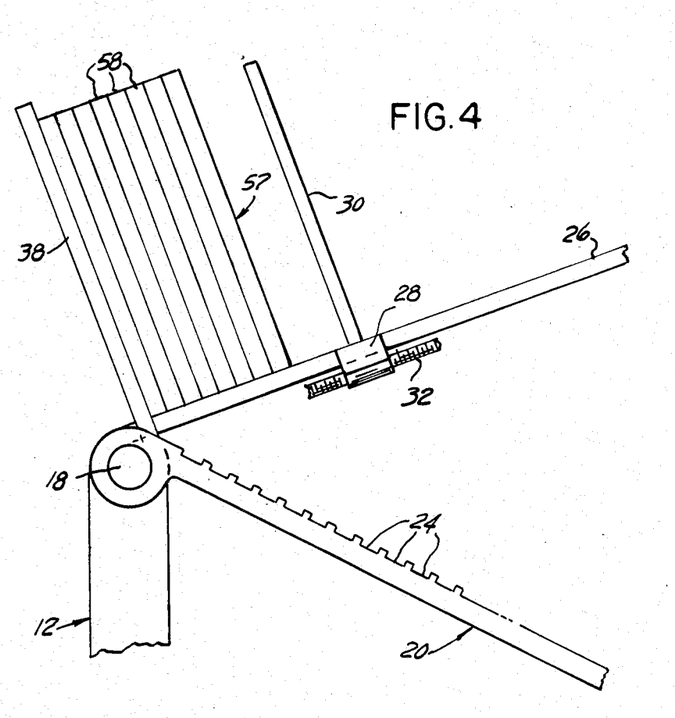
Figure 5:
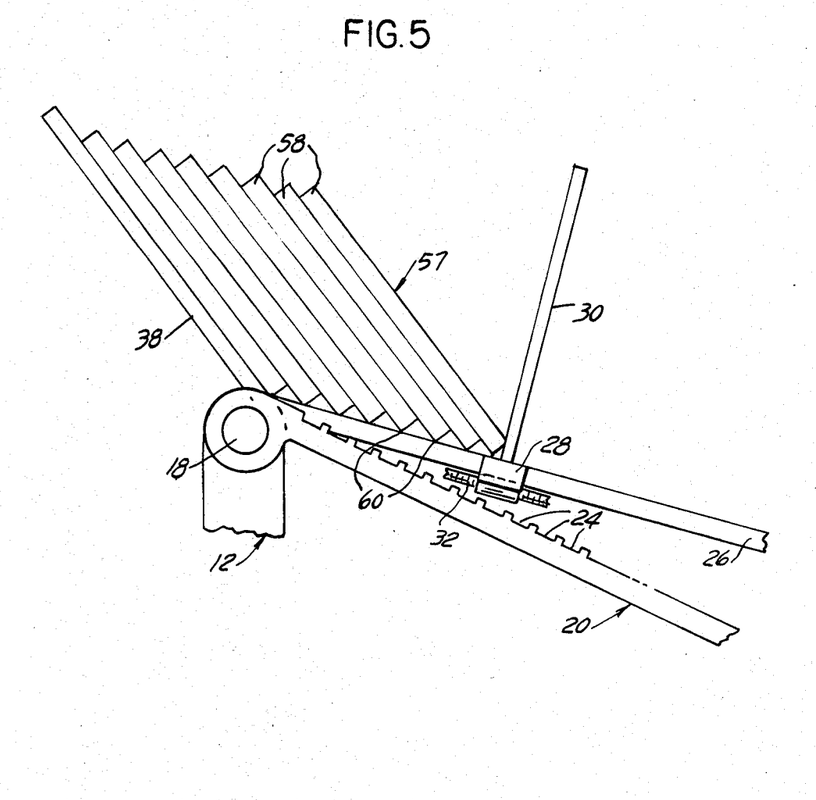

The bundle support 38 is pivoted around the shaft 18 to a position intermediary between the horizontal and the vertical, FIG. 4, while the platform 26 is pivoted upwardly to a position such that it makes a substantially 90° angle with the bundle support 38, and the elongate arm members 20 are pivoted downwardly. The platform 26 is then pivoted clockwise, as seen in the drawing, to an angular position below the horizontal, FIG. 5, with the bundle support 38 being maintained substantially in the same position as in FIG. 4, which causes each of the sheets or plates 58 in the bundle 57, resting at their bottom inner edge against the top surface of the platform 26, to slide downwardly by gravity relative to each other, when the 90° angle formed between the bundle support 38 and the platform 26 is opened to an angle larger than 90°, with the result that each sheet or plate 58 is engaged with the surface of the platform 26 at a sharp edge 60, FIGS. 5-6. The distance between the sharp edges 60 of consecutive sheets or plates 58 in engagement with the platform 26 is evidently greater than the thickness T of each sheet or plate 58. With the last sheet or plate 58 abutting against the backstop plate 30, FIG. 5, the distance between the edges 60 is equal to G, or the gap or distance between consecutive centerlines of the grooves 24 in the elongate arm members 20.

Figure 6:
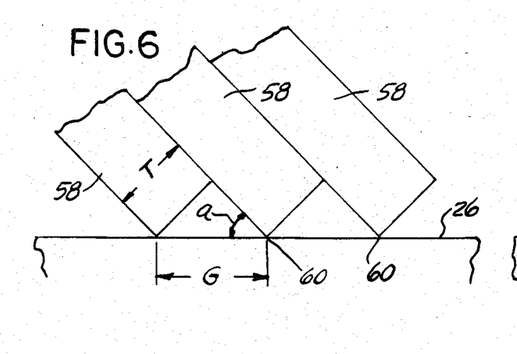

FIG. 6 illustrates the relationship existing between the thickness T of the sheets or plates 58, the angle a at which the sheets or plates 58 are disposed at their edges 60 relative to the surface of the platform 26 and the gap G or distance between the centerlines of consecutive slots 24 in the elongate arm members 20. The relationship is as follows:

$$G = T/\sin a$$

For an angle a equal to 30°, G=2T.

Figure 7:
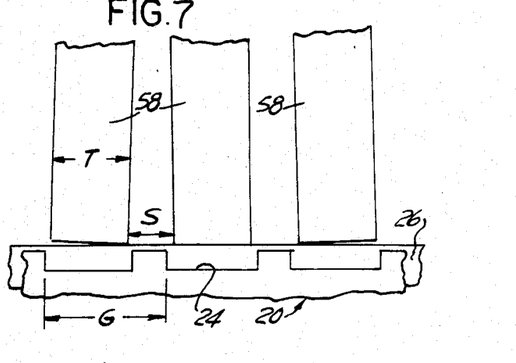
Figure 8:
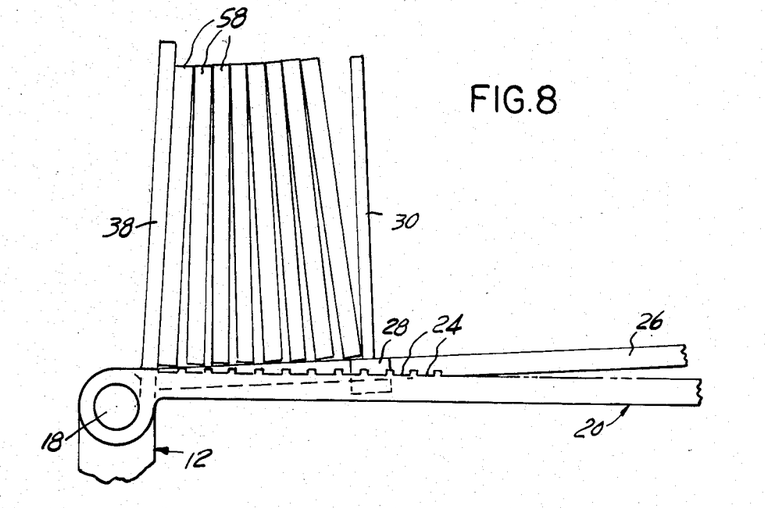

The bundle support 38 may be pivoted beyond the vertical, if necessary, such that all the sheets or plates 58 are resting at their bottom on the surface of the platform 26, FIGS. 7 and 8, with an appropriate space S between consecutive sheets or plates 58, at their bottom, which is according to the equation:

$$S = G - T, \text{ or}$$

$$S = T/\sin a - T.$$

When the platform 26 is brought back below the horizontal, FIGS. 8-9, with the elongate arm members 20 returned substantially to the horizontal, the bottom end edges of the sheets or plates 58 drop each in an appropriate groove 24 in the elongate arm members 20.

Figure 9:
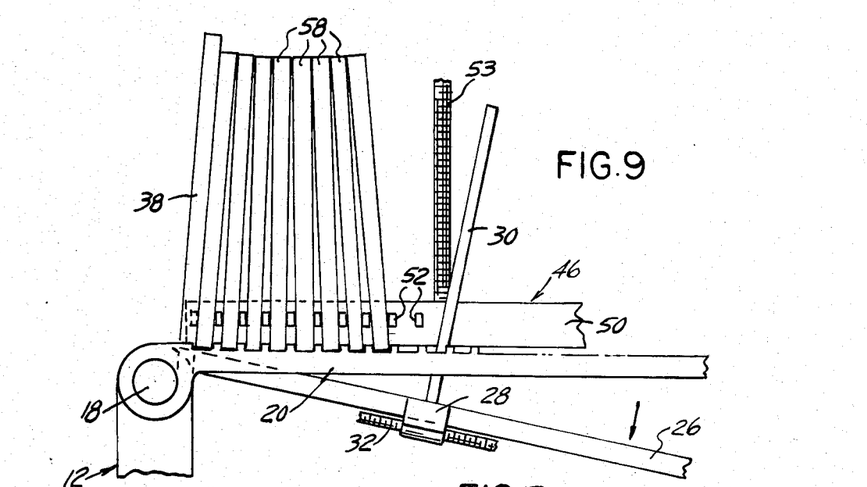

The comb member 46 is advanced in a direction transverse to the longitudinal axis of the elongate arm members 20 such as to cause each pin 52 projecting from the front of the comb bar 50 to penetrate between consecutive sheets or plates 58, FIG. 9, the pins 52 being of a diameter, or width, slightly less than the space S between consecutive sheets or plates 58 at their bottom. The pins 52 are equidistant with their centerlines disposed at a distance equal to G, or the gap or distance between the centerlines of consecutive slots or grooves 24. The pin support bar 50 is subsequently lifted such as to separate the sheets or plates 58 at their top, FIG. 10. After the platform 26 has been rotated to the downwardly directed vertical position illustrated at FIG. 9, a rack 62 is positioned below the horizontally positioned elongate arm members 20. The rack 62 has two parallel lateral frame members 64 spaced-apart less than the distance separating the two elongate arm members 20, each lateral member 64 supporting a plurality of upstanding pins 66. The space between consecutive pins 66 is slightly larger than the thickness T of the metallic sheets or plates 58, with the result that when the rack 62 is lifted relative to the elongate arm 20, by appropriate lifting means, such as a hydraulic lift 68 or the like, the sheets or plates 58 are supported vertically by the rack, FIG. 12, with the bottom of each sheet or plate disposed between consecutive pins 66, the comb member 46 being then displaced rearwardly such as to remove the comb bar pins 52 from between the sheets or plates 58. The sheets or plates 58 are supported spaced-apart by the rack 62 alone and they can be transported to any appropriate location, for treatment, for example, in an appropriate chemical bath, still being held on the rack 62.

It will be readily appreciated that the apparatus and method of the invention permits to separate rigid sheets or plates of material other than steel such as any metallic, plastic, wood sheets or plates, and the like.

It will also be readily appreciated by those skilled in the art that the apparatus and method of the invention permits to rebundle separate sheets or plates, simply by reversing the steps of the process.

Figure 12:
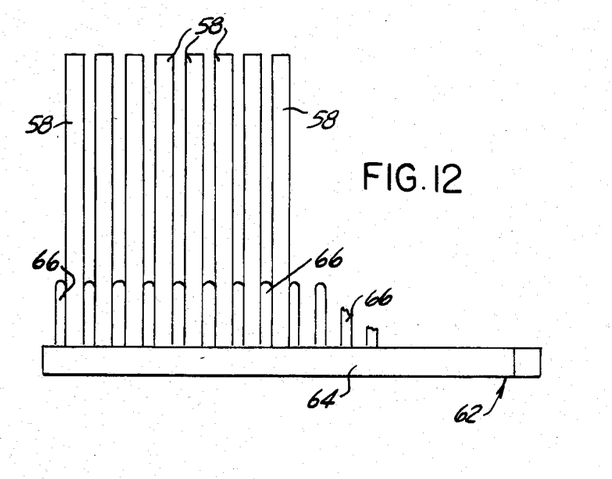
FIG. 12 is a schematic side elevation view of the separated sheets or plates as placed on a support rack.

For example, after the sheets or plates 58, still supported spaced-apart on the rack 62, FIG. 12, have been subjected to appropriate chemical treatments such as pickling for example, or after other treatment or operation requiring that the sheets 48 be disposed on the rack 62, the apparatus 10 of the invention may be used for removing the sheets 58 from the rack 62 by returning the rack 62 between the elongate arm members 20 and placing the rack 62 on top of the hydraulic lift 68 extended such that the bottom edge of the sheets 58 are above the elongate arm members 20. By dropping the rack 62 by way of the hydraulic lift 68 to a position clear of the elongate arm members 20, the sheets or plates 58 are stripped from between the pins 66 of the rack 62. The comb bar 56 may be used for holding the sheets or plates 58 at their top or proximate their top for preventing them from falling off, at least until the rack 62 is removed from between the elongate arms 20 and the platform 26 repositioned substantially horizontally. The bundle support 38 is subsequently pivoted to a substantially vertical position, the comb member 46 backed such as to remove the pins 52 of the comb bar 50 from between the sheets or plates 58, and the platform 26 pivoted substantially to the position shown at FIG. 8. Subsequent simultaneous pivoting of the platform 26 and of the bundle support 38, while being maintained disposed at a right angle to each other, FIG. 4, enables the bundle 57 to be reformed and eventually supported by the horizontally disposed bundle support 38, FIG. 3, from which it can be removed.

Having thus described the present invention by way of an example of structure well designed to practice the invention, what is claimed as new is as follows:

1. An apparatus said apparatus comprising means for pivoting a bundle of said sheets or plates from a substantially horizontal position to an angular position causing said sheets or plates to slide by gravity relative to each other, means for supporting said sheets or plates on a common planar surface at an edge of each of said sheets or plates in engagement with said common planar surface, means for pivoting said bundle of sheets or plates relative to said common planar surface for separating said sheets or plates at their bottom of a gap proportional to the angle formed by said sheets or plates with said common planar surface means for separating said sheets or plates at their top, and means for lifting said support rack above said common surface for supporting said spaced-apart sheets or plates by said rack provided with separator and support pins engageable between consecutive spaced-apart sheets or plates, wherein said means for separating said sheets or plates at their top comprises a comb member having spaced-apart pins of a thickness less than said gap, means for advancing said comb member for introducing said pins between said sheets or plates spaced-apart at their bottom, and means for vertically displacing said comb member to a position whereby said pins project between adjacent spaceda-part sheets or plates proximate the top thereof.

2. The apparatus of claim 1 further comprising a pair of substantially parallel arm members each having a plurality of transverse slots, said slots having a width slightly larger than the thickness of said sheets or plates and being separated by a distance slightly less than said gap, and further comprising means for pivotally displacing said arm members relative to said common surface for disposing the bottom edge of each of said sheets or plates in one of said slots.

3. The apparatus of claim 2 further comprising adjustable abutment means on said common planar surface for maintaining said sheets or plates in mutual engagement by limiting slippage of each of said sheets or plates relative to said common planar surface.

4. The apparatus of claim 1 further comprising adjustable abutment means on said common planar surface for maintaining said sheets or plates in mutual engagement by limiting slippage of each of said sheets or plates relative to said common planar surface.

5. An apparatus for separating sheets or plates from a bundle and for disposing said sheets or plates spaced-apart on a support rack, said apparatus comprising a pivotal bundle support, a pivotal platform, said bundle support and said platform having a generally common axis of pivoting, means for pivoting said bundle support loaded with a bundle of said sheets or plates to an angular position relative to said platform for causing said sheets or plates to slide by gravity relative to each other and be supported by said platform at an an angle with an edge of each of said sheets or plates in engagement with said platform, adjustable abutment means on said platform for maintaining said sheets or plates in mutual engagement by limiting slippage of the top one of said sheets or plates relative to said platform, means for pivoting said bundle support relative to said platform for pivoting in turn each of said sheets or plates around said edge in engagement with said platform such that consecutive ones of said sheets or plates are separated at their bottom end resting on said platform by a predetermined gap proportional to said angle, a pair of pivotal arm members each disposed on one side of said platform pivotable around said common axis, said pivotal arm members having each an upper face provided with transverse slots of a width accepting said bottom end of said sheets or plates and adjacent ones of said slots being separated by a distance less than said gap separating adjacent sheets or plates at their bottom end, means for pivoting said arm members relative to said platform for engaging each of said sheets or plates at its bottom end in one of said slots, a comb member having a plurality of equidistant pins of a thickness permitting each of said pins to be introduced between adjacent sheets or plates in said gap, and means for displacing said comb member vertically for separating said sheets or plates at their top by said pins.

6. The apparatus of claim 5 further comprising a rack narrower than the distance separating said arm members, said rack having a plurality of a pair of parallel pins each of a thickness less than the gap separating said sheets or plates, and means for vertically displacing said rack relative to said arm members for removing said sheets or plates from said arm members and supporting said sheets or plates spaced-apart on said rack.

7. A method for subjecting to chemical treatment a bundle of sheets or plates, said method comprising placing said bundle in a substantially horizontal position, lifting one end of said bundle for disposing said bundle at an angle for causing said sheets or plate to slide by gravity relative to each other, engaging a bottom edge of each of said sheets or plates with a common substantially horizontal surface, pivoting said sheets or plates in unison relative to said common surface such as to separate adjacent sheets or plates from each other at their bottom of a gap distance proportional to the angle formed by said sheets or plates with said common surface prior to pivoting, pivotally displacing a pair of substantially parallel arm members each having a plurality of transverse slots of a width slightly larger than the thickness of said sheets or plates and separated by a distance slightly less than said gap distance for disposing the bottom edge of each of said sheets or plates in one of said slots, separating said sheets or plates at their top such that adjacent sheets or plates are separated at their top by substantially said gap distance, lifting the spaced-apart sheets or plates by means of a support rack provided with separator and holding pins of a thickness slightly less than said gap distance for vertically supporting said spaced-apart sheets or plates by said support rack, and subjecting said sheets or plates to a chemical treatment while supported on said support rack.

8. The method of claim 7 further comprising subsequently placing said common surface substantially horizontally in engagement with the bottom edge of said sheets or plates supported on said support rack, placing a second surface substantially vertically in engagement with an extreme one of said sheets or plates, positioning said common and second surfaces substantially at a right angle relative to each other, and pivoting said common and second surfaces in unison for disposing said second surface in a substantially horizontal position and said common surface in a substantially vertical position while simultaneously dropping said support rack, whereby a bundle of sheets or plates is formed and is supported by said second surface.

9. An apparatus for separating sheets or plates from a bundle and for disposing said sheets or plates spaced-apart on a support rack, said apparatus comprising means for pivoting a bundle of said sheets or plates from a substantially horizontal position to an angular position causing said sheets or plates to slide by gravity relative to each other, means for supporting said sheets or plates on a common planar surface at an edge of each of the sheets or plates in engagement with said common planar surface, means for pivoting said bundle of sheets or plates relative to said common planar surface for separating said sheets or plates at their bottom of a gap proportional to the angle formed by said sheets or plates with said common planar surface, means for separating said sheets or plates at their top, means for lifting said support rack above said common surface for supporting said spaced-apart sheets or plates by said rack provided with separator and support pins engageable between consecutive spaced-apart sheets or plates, a pair of substantially parallel arm members each having a plurality of transverse slots, said slots having a width slightly larger than the thickness of said sheets or plates and being separated by a distance slightly less than said gap, and means for pivotally displacing said arm members relative to said common surface for disposing said bottom edge of each of said sheets or plates in one of said slots.

10. The apparatus of claim 9 further comprising adjustable abutment means on said common planar surface for maintaining said sheets or plates in mutual engagement by limiting slippage of each of said sheets or plates relative to said common planar surface.

* * * * *

UNITED STATES PATENT AND TRADEMARK OFFICE
CERTIFICATE OF CORRECTION

PATENT NO. : 4,664,581

DATED : May 12, 1987

INVENTOR(S) : Robert K. Matthews

It is certified that error appears in the above-identified patent and that said Letters Patent is hereby corrected as shown below:

Col. 3, line 25, delete "a" and insert --*a*--.

Col. 4, line 58 after "apparatus" first occurrence, insert --for separating sheets or plates from a bundle and for disposing said sheets or plates spaced-apart on a support rack,--.

Col. 5, lines 13-14, delete "spaceda-part" and insert spaced-apart--.

Signed and Sealed this

Third Day of November, 1987

Attest:

DONALD J. QUIGG

Attesting Officer

Commissioner of Patents and Trademarks